(12) United States Patent
Wright et al.

(10) Patent No.: US 6,866,737 B2
(45) Date of Patent: Mar. 15, 2005

(54) METHOD FOR MECHANICALLY EMBOSSING A SURFACE COVERING USING A RECYCLABLE SOLIDIFIED SLURRY EMBOSSING TOOL

(75) Inventors: Ralph W. Wright, Lancaster, PA (US); W. Craig Brossman, Terre Hill, PA (US); William B. Saporetti, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 147 days.

(21) Appl. No.: 09/955,606

(22) Filed: Sep. 18, 2001

(65) Prior Publication Data

US 2003/0056885 A1 Mar. 27, 2003

(51) Int. Cl.[7] ................................................. B31F 1/07
(52) U.S. Cl. ...................... 156/209; 264/37.1; 264/166; 264/219; 264/293; 264/317
(58) Field of Search ................................. 156/219, 242, 156/246, 209; 264/37.17, 37.18, 119, 166, 219, 284, 293, 313, 317, 37.1; 101/32

(56) References Cited

U.S. PATENT DOCUMENTS

| | | |
|---|---|---|
| 1,910,894 A | 5/1933 | George et al. |
| 2,752,279 A | 6/1956 | Alderfer ................... 154/100 |
| 3,000,754 A | 9/1961 | Zentmyer .................. 117/21 |
| 3,121,642 A | 2/1964 | Biskup ..................... 117/15 |
| 3,293,094 A | 12/1966 | Nairn et al. ............... 156/79 |
| 3,655,312 A | 4/1972 | Erb et al. .................. 425/115 |
| 3,807,013 A * | 4/1974 | Sukenik ................... 29/895.32 |
| 3,887,678 A | 6/1975 | Lewicki, Jr. ............... 264/284 |
| 3,953,639 A | 4/1976 | Lewicki, Jr. ............... 428/160 |
| 4,022,643 A | 5/1977 | Clark ........................ 156/78 |
| 4,100,318 A | 7/1978 | McCann et al. ........... 428/159 |
| 4,158,078 A | 6/1979 | Egger et al. ............... 427/195 |
| 4,214,028 A | 7/1980 | Shortway et al. .......... 428/159 |
| 4,396,566 A | 8/1983 | Brinkmann et al. ........ 264/70 |
| 4,407,882 A | 10/1983 | Hauser et al. ............. 428/159 |
| 4,530,856 A | 7/1985 | Kauffman et al. ......... 427/197 |
| 4,617,222 A | 10/1986 | Courtoy et al. ............ 428/142 |
| 4,734,321 A * | 3/1988 | Radvan et al. ............. 442/76 |
| 4,756,951 A | 7/1988 | Wang et al. ............... 428/204 |
| 4,844,849 A | 7/1989 | Miller et al. .............. 264/46.4 |
| 5,262,100 A * | 11/1993 | Moore et al. .............. 264/489 |
| 5,336,693 A | 8/1994 | Frisch ....................... 521/72 |
| 5,458,953 A | 10/1995 | Wang et al. ............... 428/195 |
| 5,569,419 A * | 10/1996 | Brenot et al. ............. 264/37.18 |
| 5,961,903 A | 10/1999 | Eby et al. ................. 264/46.5 |
| 6,114,008 A | 9/2000 | Eby et al. ................. 428/151 |
| 6,173,496 B1 * | 1/2001 | Makoui et al. ........... 29/895.21 |

FOREIGN PATENT DOCUMENTS

| | | | |
|---|---|---|---|
| DE | 3824292 A * | 1/1990 | ............ B32B/7/02 |
| GB | 1422142 | 1/1976 | ............ B44C/1/22 |
| JP | 63-33430 | 2/1988 | |
| JP | 1-110123 | 4/1989 | ............ B29C/59/04 |
| JP | 8-244060 | 9/1996 | ............ B29C/44/00 |

OTHER PUBLICATIONS

English abstract of DE 3824292.*

* cited by examiner

Primary Examiner—Jeff H. Aftergut
Assistant Examiner—John L. Goff

(57) ABSTRACT

Disclosed is both a method and apparatus for mechanically embossing a surface covering. The apparatus includes an embossing tool comprising a slurry. The slurry includes both a filler and binder. The method includes printing a slurry onto a surface covering and compressing the slurry onto the surface covering to create a mechanically embossed texture onto the surface covering.

13 Claims, 5 Drawing Sheets

METHOD FOR MECHANICALLY EMBOSSING A SURFACE COVERING USING A RECYCLABLE SOLIDIFIED SLURRY EMBOSSING TOOL

FIELD OF THE INVENTION

The present invention relates generally to surface coverings and in particular to a method and apparatus for mechanically embossing a surface covering using a recyclable embossing tool.

BACKGROUND

Decorative laminate surface coverings can be formed into sheets or individual tiles. Typically, in the manufacture of a resilient floor covering, a wear layer is combined with a substrate and resin to form the resilient sheet or tile. The substrate usually comprises a felted or matted fibrous sheet of overlapping, intertwined filaments or fibers. A substantially uniform layer of a liquid or semi-liquid resinous composition containing a synthetic polymeric material, usually an ungelled polyvinyl chloride plastisol and a blowing or foaming agent is typically applied to the substrate. The liquid or semi-liquid plastisol vinyl resin composition is subsequently firmed or gelled at an elevated temperature. This gelled plastisol may be printed with a decorative pattern or design having a blowing or foaming inhibitor for chemically embossing the substrate.

Typically, a texture may be either mechanically embossed by pressing a pattern/texture into the surface covering or chemically embossed by using foam retarding agents to restrict expansion of a foamable layer in specific regions of the design. Furthermore, both methods may be used in combination.

Mechanical embossing is the earlier of the two described embossing methods and requires the use of suitably engraved or etched plates or rolls which press against and into a resinous product or surface covering under relatively great pressure to obtain a desired embossed decorative or textured surface. An embossing roll or plate can only impart an embossed pattern corresponding to the etched or engraved pattern on the plate or roll. Often, the engraved pattern is made to create an embossed decorative texture that is in register with a printed design located on the surface covering.

Alternatively, a surface covering may be both mechanically and chemically embossed as described in U.S. Pat. Nos. 4,022,643 and 6,114,008, and Japanese Patent Publication # 63-33430 incorporated herein by reference. This reference includes coating a backing layer with a foamable layer, and adding a print layer to it. The print layer forms a design and a portion of the design is formed with a retarder composition. A thermoplastic wear layer is applied onto the print layer and cured by heat at a temperature sufficiently high enough to expand the foamable layer. The areas of the design layer where the retarder composition is applied are also chemically embossed during such curing. The wear layer is then mechanically embossed to have a surface texture in the wear layer overlying the unrestricted/up areas. Optionally, a top coat can be applied to the wear layer before curing and expanding the foam, and the top coat can be mechanically embossed.

Despite the known methods for making an embossed surface covering, there is a need for a method for mechanically embossing a surface covering without requiring the use of dedicated engraved or etched embossing plates and embossing rolls to deliver an in register embossed texture. Embossing rolls or plates used to mechanically emboss in register an imprinted design are expensive. Each new desired embossed pattern requires the manufacture of a new embossing roll or plate to deliver an embossed design which is in register with the printed design of the surface covering. Thus, there is a need for a mechanical embossing tool that can deliver an in register design without the need to create a new dedicated embossing roll, plate or belt.

SUMMARY

Briefly described, the present invention comprises both a method and apparatus for mechanically embossing a surface covering. In one embodiment, an embossing tool for mechanically embossing a surface covering is provided. The embossing tool includes a slurry in a pattern which is attached to a backing. The slurry can be readily detached from the backing after mechanically embossing the surface covering. The slurry is comprised of both a filler and a binder.

In greater detail, the slurry is substantially stable at a temperature range of from about 200° F. up to about 450° F. The backing may be an embossing roll, an embossing belt, an embossing plate or a combination of any of the three. The slurry can be biodegradable and may include gelatin, cornstarch, limestone and clay. Typically, the filler is a particle having an average mesh size of between about 20 and 400. The embossed pattern may be in register with a printed pattern on the surface covering.

The present invention further includes a method for manufacturing a mechanically embossed surface covering. The method includes printing a slurry onto a surface covering and compressing the slurry onto the surface covering to create a mechanically embossed surface texture on the surface covering. The slurry may be compressed onto the surface covering using either an embossing roll, plate, belt or a combination of the three. The slurry may be printed onto the surface covering using a screen printer and printed in register with a printed pattern on the surface covering. Other printing techniques can be employed depending upon the desired embossing effect.

In a further embodiment, the method for manufacturing a mechanically embossed surface covering includes printing the slurry in a pattern onto a backing. The pattern may then be mechanically embossed in register with a design printed on the surface covering. The backing may be an embossing roll, drum, plate, belt or combinations thereof.

Additionally, the definition of surface covering as used includes surface covering components. A surface covering component is any substrate combined with one or more layers, applied in any manner known in the art, which is not yet a commercially ready product. Surface covering components include one or more layers such as substrates, foamed layers, pattern layers, wear layers, top coat layers and the like. Furthermore, the term printing includes applying a material.

DETAILED DESCRIPTION

Figure 1:
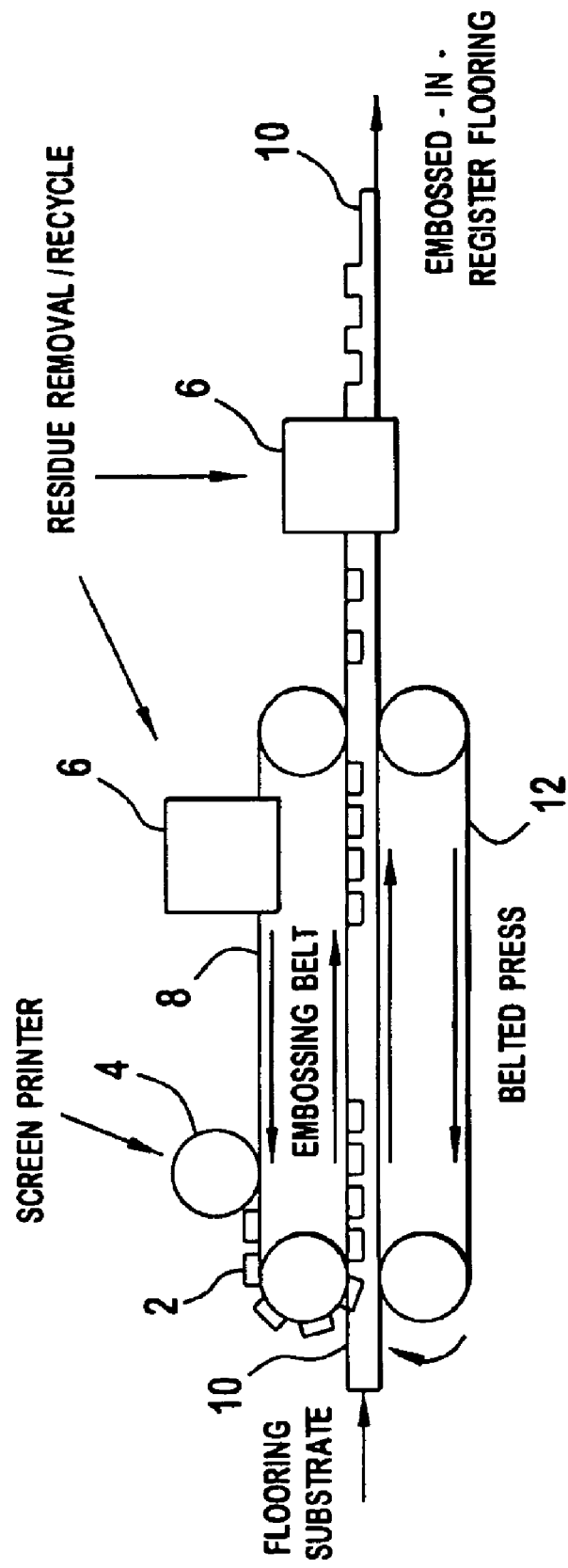
FIG. 1 is a schematic view of an embodiment of a process for mechanically embossing a surface covering using an embossing belt and a belted press wherein the surface covering is embossed in register.

The present invention comprises both a method and apparatus for mechanically embossing a surface covering. The apparatus includes an embossing tool comprising a slurry. The slurry includes both a filler and binder. The method includes printing a slurry onto a surface covering and pressing the slurry onto the surface covering to create a mechanically embossed texture onto the surface covering.

In greater detail, the embossing tool for mechanically embossing a surface covering includes a slurry 2 which is releasably disposed onto a backing or a surface covering 10. The slurry 2 comprises a binder and a filler. The slurry typically includes the ability to be printed onto the backing or onto the surface covering 10 such that it can sustain a printed shape and impart an embossed pattern onto the surface covering 10. The slurry 2 may be disposed in a pattern that is in register with a printed design disposed on the surface covering 10. Additionally, the slurry 2 may be printed or deposited in any pattern or in a random fashion to impart an embossed texture to the surface covering 10.

Furthermore, the slurry 10 is typically stable at a temperature range from about 200° F. up to about 450° F. Of course, this temperature range may be expanded in either direction depending upon the conditions needed to emboss the surface covering 10. For example, the slurry 2 may be stable at temperatures up to about 650° F. The slurry may be a water based slurry, but solvent or non-aqueous slurries can be used to achieve the desired effect. However, these have to be carefully selected to allow easy removal after the embossing process.

The binder may be any binder capable of holding the slurry together to form a printed pattern and substantially stable at elevated temperatures, and is removable after embossing. Example binders may include water soluble polymers such as polyvinyl alcohol, polyacrylic acid copolymers, as well as water insoluble polymers. The only limitation is that the binder needs to function acceptably in the process. In one embodiment, the binder is biodegradable. Example biodegradable binders include gelatin and cornstarch but the present binder is not limited to only the above given examples. Any stable biodegradable binder that is capable of embossing a surface covering in combination with a filler may be used.

The filler may be any filler capable of imparting an embossed texture onto a surface covering 10 as a result of the process. The filler is typically stable at elevated temperatures which are often present in forming the embossed surface covering 10. Typically, the filler is inorganic and is dimensioned to impart a pattern or embossed texture. The filler may be of almost any size and capable of maintaining integrity up to and through the compression step of embossing the surface covering 10. The filler should be able to be substantially removed from the embossed surface covering 10 and be compressed onto the surface covering 10. Typically, the filler is recyclable.

Additionally since the printed slurry 2 is in contact with the surface covering 10, the size of the filler can directly affect the final texture of the surface covering 10. A surface covering 10 may have either a smooth or coarse texture depending upon the size of the filler and amount of filler employed in the formulation. The variation in texture provides for control of the gloss level and surface micro texture in the resulting surface areas of the embossed surface covering 10 corresponding to printed slurry regions. When a textured embossing roll is used in combination with the slurry, the surface texture of the product typically does not reflect the texture of the embossing roll in the corresponding slurry regions. This can result in a surface covering having at least three regions with a different texture and gloss.

The filler may have an average mesh size of about 20 to about 400. Furthermore, the slurry 2 may have at least two different sized fillers, wherein a first sized filler has a mesh size ranging from about 20 to 60 and a second sized filler has a mesh size ranging from about 250 to about 450. Typically, the filler is limestone, silica sand, clay or combinations thereof.

In one embodiment the slurry 2 comprises a filler from between about 30% to 70% by weight, water from between about 5% to about 70% by weight and a binder from between about 5% to about 25% by weight. The slurry may further comprise up to about 15% by weight of a plasticizer. Typically, the plasticizer comprises a vegetable oil such as corn oil. The binder may include gelatin and/or cornstarch. Additionally, a biocide may be added to the slurry.

Illustrated below in Table 1 are various example formulations for the slurry.

TABLE 1

| Ingredients | Wt. (pounds) | PHF | % |
|---|---|---|---|
| Slurry Print 2C1 | | | |
| 40 mesh CaCO3 | 15.5 | 60.0 | 31.08 |
| 325 mesh CaCO3 | 7.8 | 30.0 | 15.54 |
| Klondyke Clay | 2.6 | 10.0 | 5.18 |
| H2O | 15.5 | 60.0 | 31.08 |
| Cornstarch | 4.1 | 16.0 | 8.29 |
| Gelatin | 0.5 | 2.0 | 1.04 |
| Corn Oil | 3.9 | 15.0 | 7.77 |
| Zn Omadine (48%) | 0.0 | 0.03 | 0.02 |
| TOTAL | 50 | 193 | 100 |
| Slurry Print 2C2 | | | |
| 40 mesh CaCO3 | 16.2 | 60.0 | 32.43 |
| 325 mesh CaCO3 | 8.1 | 30.0 | 16.21 |
| Klondyke Clay | 2.7 | 10.0 | 5.40 |
| H2O | 16.2 | 60.0 | 32.43 |
| Cornstarch | 4.3 | 16.0 | 8.65 |
| Gelatin | 0.5 | 2.0 | 1.08 |
| Corn Oil | 1.9 | 7.0 | 3.78 |
| Zn Omadine (48%) | 0.0 | 0.03 | 0.02 |
| TOTAL | 50 | 185 | 100 |

In further detail, FIG. 1 illustrates one embodiment wherein the surface covering is mechanically embossed using an embossing belt 8 and a belted press 12. The slurry is printed onto the embossing belt 8 using a screen printer 4. The screen printer 4 can deposit the slurry 2 onto the embossing belt 8 in a desired pattern. The screen printer 4 may be interchangeable depending upon the desired pattern to be printed.

In one embodiment, the slurry 2 is printed in a pattern that is in register with a design printed on the surface covering to be embossed. Once the slurry 2 has been printed onto the embossing belt 8 it is then brought in contact with the surface covering 10 in combination with the belt press 12. The belt press 12 compresses the slurry 2 into the surface covering to create a mechanically embossed surface. Additionally, in the use of an embossing belt 8, the slurry typically has limited adhesion properties, which enables it to stick to the belt, but still can be removed from the embossing belt 8 after embossing occurs. The embossing belt material may be comprised of any suitable material such as steel mesh, a fiber reinforced belting material, or any belt material that can function as a mechanical embossing belt. Furthermore, for embossing in register the belt material is typically dimensionally stable, or sufficiently predictable to allow registration of the slurry 2 printed with the patterned design of the surface covering 10. The printed slurry 2 in one embodiment is printed onto the belt appropriately to create registration with the pattern on the substrate.

Once the surface covering 10 has been mechanically embossed, the remaining slurry 2 may be removed from both the surface covering 10 and the embossing belt 8 by a residue removal unit 6. The residue removal unit 6 may employ any mechanical means for removing the slurry 2. Example mechanical means include the use of compressed air to blow off the remaining slurry, a water jet to spray off the slurry or a combination of the two. Additionally, the slurry may be brushed off the surface covering 10 and the embossing belt 8. Once the slurry 2 has been removed it may then be recycled and reused.

Figure 2:
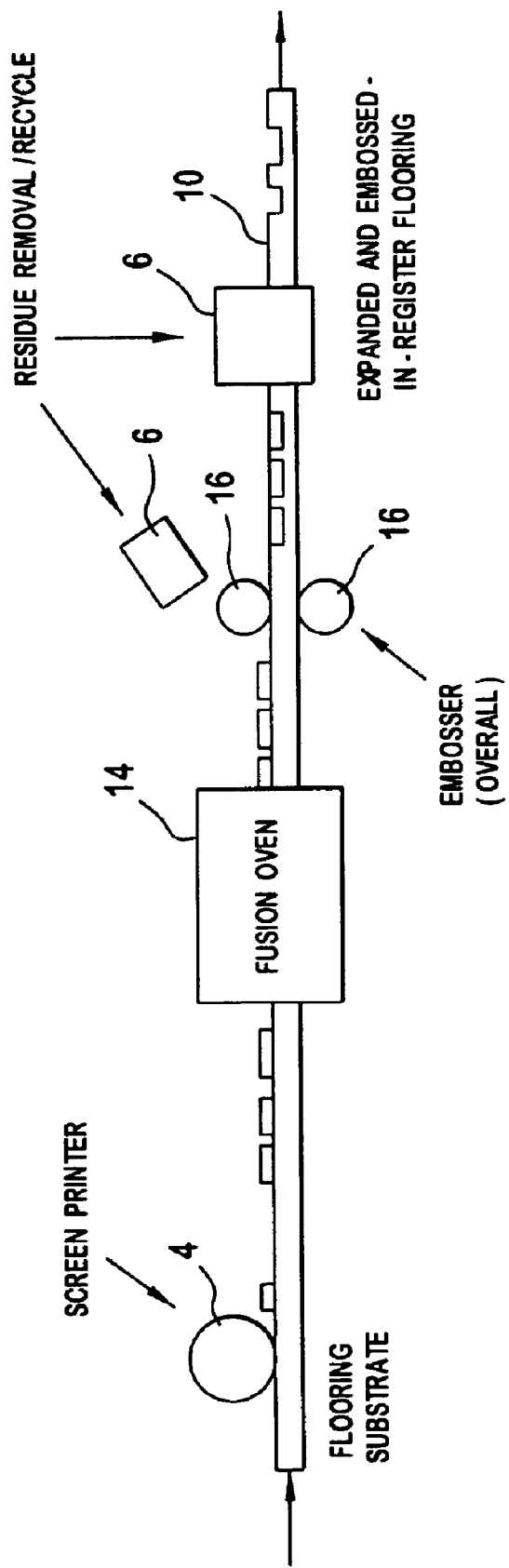
FIG. 2 is a schematic view of another embodiment of a process of manufacturing a mechanically embossed surface covering using a screen printer and an embossing roll wherein the surface covering is embossed in register.

FIG. 2 illustrates an additional embodiment wherein the surface covering 10 is mechanically embossed using a screen printer and an embossing roll. In this embodiment the slurry 2 is deposited onto the surface covering 10 using a screen printer 4. Of course, other means of printing or depositing the slurry 2 may be used depending upon the desired printed pattern and the type of slurry used. Once the slurry 2 has been printed onto the surface covering 10 the combination then enters a fusion oven 14 where the surface covering 10 is fused and the slurry 2 is dried. By applying the slurry 2 before the surface covering 10 has completely cured, the chemistry of the slurry composition can influence the further cure of the top coating in or after the embossing process. While not being bound to any one theory, it is thought that slurry composition can inhibit polymer cross-linking in the surface covering. Such an influence can alter the appearance of the finished product either positively or negatively depending upon the desired effect.

Upon exiting the fusion oven 14 the slurry 2 may then be compressed onto the surface covering using an embossing roll 16. The embossing roll may have a smooth surface or it may have a textured surface depending upon the desired effect for the overall finished product. In one embodiment the surface covering 10 is embossed in register with a printed design on the surface covering 10. Once the surface covering 10 has been embossed the slurry 2 may be removed using a residue removal unit 6 as previously described. The removed slurry may then be recycled and reused.

Figure 3:
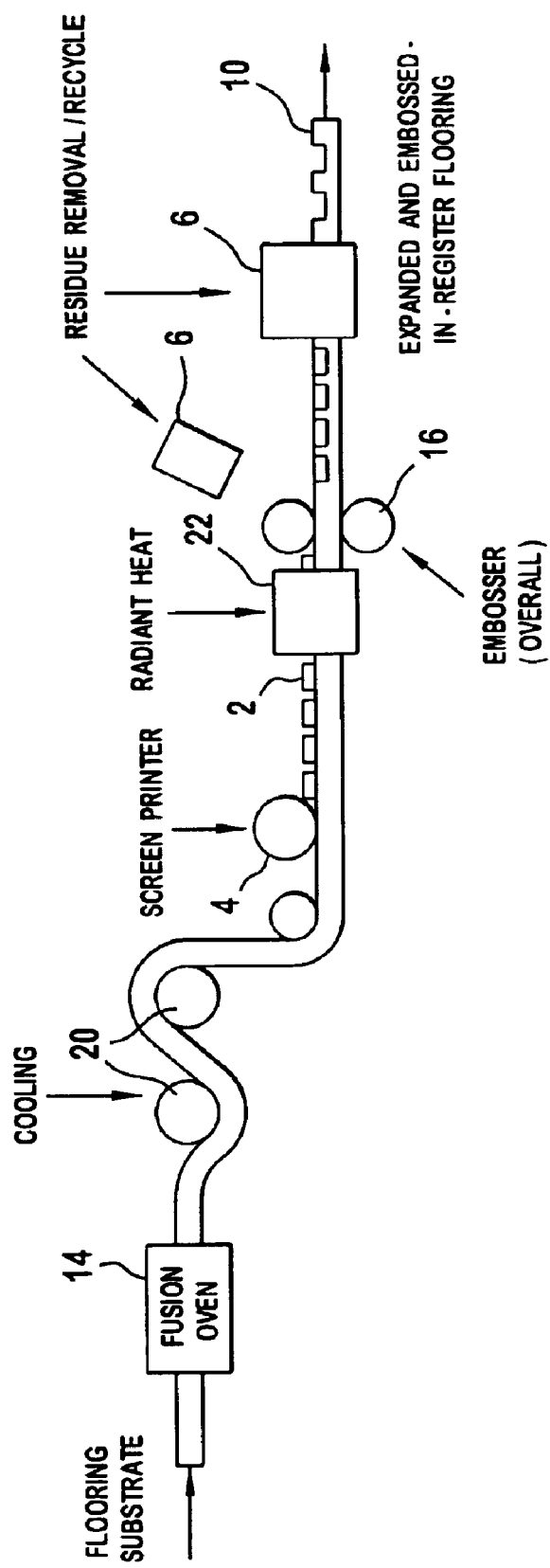
FIG. 3 is a schematic view of the present process including depositing the slurry with a screen printer after the surface covering has first been fused and expanded and chemically embossed if desired.

FIG. 3 is a schematic view of the present process including depositing the slurry 2 after the fusion oven 14. In this embodiment the surface covering 10 exits the fusion oven 14 and is cooled on cooling rolls 20 before being screen printed by the screen printer 4. In another embodiment, the surface covering 10 is chemically embossed as it exits the fusion oven, and is cooled before screen printing. After the slurry 2 is screen printed it is then embossed using an embossing roll 16 and the slurry is removed by the residue removal units 6.

Figure 4:
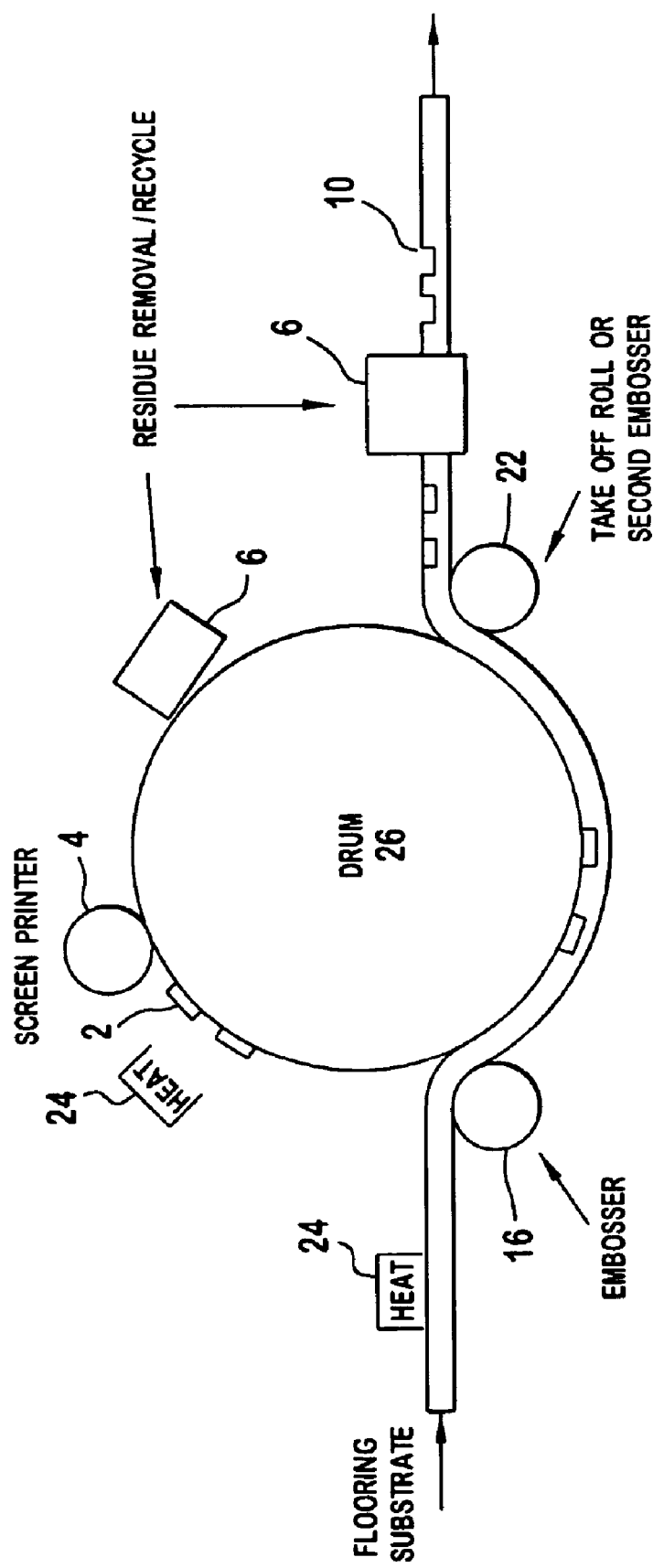
FIG. 4 is a schematic view of another embodiment of the process of manufacturing a mechanically embossed surface covering using a screen printer and a drum wherein the surface covering is embossed in register.

FIG. 4 illustrates the drum roll embodiment of the present process. The slurry 2 is directly printed onto the drum roll 26 and partially dried using a heater 24. The printed slurry 2 residing on the drum roll 26 and the surface covering 10 are brought in contact under pressure using an embosser roll 16. The slurry 2 is then compressed onto the surface covering 10 and the surface covering is then removed from the drum roll 26 using a take off roll 22. The residual slurry 2 left on both the drum roll 26 and the surface covering 10 may then be removed using the previously described residual removal unit 6. The roved slurry 2 may then be recycled and reused.

Figure 5:
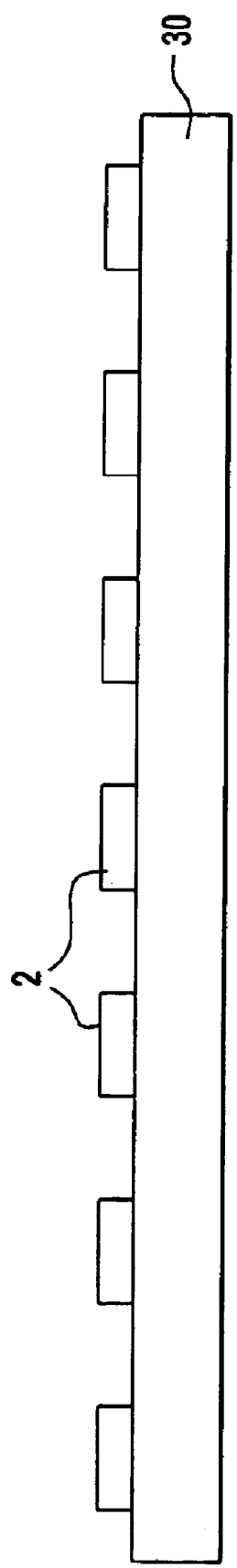
FIG. 5 illustrates the slurry printed onto a backing.

FIG. 5 illustrates the slurry 2 as printed onto a backing 30. The backing may be any embossing surface. Surface textures may be made by using a drum roll 26 or embossing belt 8. The slurry 2 may be printed directly on the surface covering. The slurry 2 may be printed in pattern that may be in register with a printed design on the surface covering 10.

Furthermore, in another embodiment the surface covering 10 can be chemically embossed in combination with the mechanically embossing. One technique of chemically embossing the surface covering 10 includes an expandable foam layer comprising a resinous composition containing a chemical blowing agent applied to a surface of a substrate. Preferably, the expandable foam layer has a uniform thickness. The expandable foam layer is coated onto the substrate by any suitable conventional coating apparatus such as a reverse roll coater, a doctor blade, an air knife, or other similar coating apparatus.

The coated substrate may then be passed through a heating unit to at least partially gel or solidify the thermoplastic resinous coating without decomposing the blowing agent. Any conventional heating unit such as a bank of radiant heaters, an oven, a heated drum, and the like may be utilized. Depending upon the material, the foamable layer can also be produced by melt processing techniques such as calendaring or extrusion. The solidified/gelled expandable layer is then printed with a pattern/design regions of which contain an expansion inhibitor composition. Subsequently, a wear layer is applied.

The wear layer coated web is then passed through a fusion oven 14 to fuse, cure, and expand the coated web, thereby forming a surface covering 10. The fusion oven 14 can be any heating apparatus such as a hot air impingement oven or infrared heat lamp. Preferably, the fusion oven 14 heats both surfaces of the coated web. The fusion oven 14 raises the temperature of the resinous compositions on the surface covering 10 high enough to sufficiently cause the selective decomposition of the blowing agent contained in the foam layer and to completely solvate and fuse all resinous layers on the surface covering 10. If the surface covering 10 comprises a resinous composition, the surface covering 10 is fused to an adjacent resinous layer, such as the foam layer. The foamable areas not in contact with, or exposed to, any inhibitor composition can reach their maximum expansion or blow. The portion of foamable layer in contact with any area or composition having a concentration of inhibitor can have little or no foam structure or expansion. However, as indicated above, those foam areas exposed to a portion of the print layer on the surface covering having smaller concentrations of inhibitor can have more foam structure or expansion than those areas having a greater concentration of inhibitor.

The following examples are intended to illustrate the invention and it is thought variations will occur to those skilled in the art. Accordingly, it is intended that the scope of the invention should be limited only by the appended claims.

EXAMPLES

Example One

A surface covering comprising a substrate formed from a 10 mil felt, 25 mils of 60% filled PVC HMC layer, and 8 mils of foamable gel. The substrate was gravure printed with a pattern. One of the inks contained 12% BTA for registered inhibition of the expansion of the foam gel. The printed substrate was then coated with 15 mils of a plastisol clear coat which was then gelled. A high gloss top coat of the type described in U.S. Pat. No. 4,781,987 was coated and dried by heating to a range of 240° F. to 290° F. The aqueous slurry was then screen printed onto the cooled substrate in register with the gravure printed pattern and in such a way that it was not always coincident with the ink that contained the 12% BTA.

The substrate was then fused/expanded and mechanically embossed with a tool that had an overall sand texture. The printed on substrate was then flaked/washed from the topcoat surface and recycled into the slurry. The finished product contained areas of differential gloss and texture that were substantially in register with the gravure print. The product had a surface that had regions with high gloss where the tool did not contact the chemically embossed surface, regions that had medium gloss due to the texturing of the embossing tool and regions with low gloss where the slurry had been printed.

| Slurry formulations | | | | |
|---|---|---|---|---|
| Ingredients | Spec. # | Wt. grams | PHF* | % |
| Slurry Print I | | | | |
| 40 mesh CaCO3 | | 208.0 | 65.0 | 41.67 |
| 325 mesh CaCO3 | | 112.0 | 35.0 | 22.44 |
| H2O | | 128.0 | 40.0 | 25.64 |
| Cornstarch | | 48.0 | 15.0 | 9.62 |
| Gelatin (Knox unflavored) | | 3.2 | 1.0 | 0.64 |
| Total | | 499 | 156 | 100.00 |
| Slurry Print IA | | | | |
| 40 mesh CaCO3 | | 155.0 | 50.0 | 31.06 |
| 325 mesh CaCO3 | | 155.0 | 50.0 | 31.06 |
| H2O | | 139.5 | 45.0 | 27.95 |
| Cornstarch | | 46.5 | 15.0 | 9.32 |
| Gelatin (Knox unflavored) | | 3.1 | 1.0 | 0.62 |
| Total | | 499 | 161 | 100.00 |

*PHF is "parts per hundred filler" (filler is limestone and clay in the formulations)

Example Two

Example Two was performed in a similar manner as in Example One, except that the slurry was printed onto the surface of the product after fusion/expansion had been effected, but before the mechanical embossing had been accomplished. The resulting surface covering had the three different regions. The resulting gloss difference between the printed slurry areas and non slurry printed areas was less than that achieved when the slurry printing was effected before fusion as in Example One.

| Slurry formulations | | | | |
|---|---|---|---|---|
| Ingredients | Spec. # | Wt. In grams | PHF* | % |
| Slurry Print 2 | | | | |
| Fine Silica Spheres | | 84.0 | 40.0 | 16.74 |
| Klondyke Clay | | 126.0 | 60.0 | 25.10 |
| H2O | | 252.0 | 120.0 | 50.21 |
| Cornstarch | | 37.8 | 18.0 | 7.53 |
| Gelatin (Knox unflavored) | | 2.1 | 1.0 | 0.42 |
| Total | | 502 | 239 | 100.00 |
| Slurry Print 2A | | | | |
| 40 mesh CaCO3 | | 117.5 | 50.0 | 23.36 |
| Klondyke Clay | | 117.5 | 50.0 | 23.36 |
| H2O | | 223.3 | 95.0 | 44.39 |
| Cornstarch | | 42.3 | 18.0 | 8.41 |
| Gelatin (Knox unflavored) | | 2.4 | 1.0 | 0.47 |
| Total | | 503 | 214 | 100.00 |
| Slurry Print 2B | | | | |
| 40 mesh CaCO3 | | 132.5 | 50.0 | 26.46 |
| 325 mesh CaCO3 | | 79.5 | 30.0 | 15.87 |
| Klondyke Clay | | 53.0 | 20.0 | 10.58 |
| H2O | | 185.5 | 70.0 | 37.04 |
| Cornstarch | | 47.7 | 18.0 | 9.52 |
| Gelatin (Knox unflavored) | | 2.7 | 1.0 | 0.53 |
| Total | | 501 | 189 | 100.00 |

*PHF is "parts per hundred filler" (filler is limestone and clay in the formulations)

While specific embodiments have been set forth as illustrated and described above, it is recognized that variations may be made with respect to disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A method of mechanically embossing an article comprising applying a recyclable and reusable slurry in a pattern onto a backing, solidifying the slurry, pressing the slurry into the article to mechanically emboss the article, removing the slurry from the backing and article after embossing the article, and then reclaiming the slurry.

2. The method, of claim 1, wherein the backing is selected from the group consisting of a belt, a drum, a roll, a plate and combinations thereof.

3. The method of claim 1, wherein the slurry is applied by screen printing onto the backing.

4. The method of claim 1, wherein the slurry comprises a filler and a binder.

5. The method of claim 4, wherein the binder is biodegradable.

6. The method of claim 1, wherein the slurry is applied in register with a printed pattern on the article.

7. The method of claim 1, wherein the article is chemically embossed.

8. The method of claim 1, further including imparting a differential gloss on the article.

9. The method of claim 1, wherein the article is a surface covering.

10. The method of claim 1, wherein the solidified slurry is in direct contact with the article when it is pressed into the article.

11. The method of claim 1, wherein the portion of the article into which the solidified slurry is pressed is gelled prior to the solidified slurry being pressed.

12. The method of claim 1, wherein the portion of the article into which the solidified slurry is pressed is cured prior to the solidified slurry being pressed.

13. The method of claim 9, wherein the surface covering is a floor covering.

* * * * *